United States Patent

Byrd

[11] Patent Number: 5,821,427
[45] Date of Patent: Oct. 13, 1998

[54] LIQUID VELOCITY MEASUREMENT USING CURVE FITTING FOR PEAK VELOCITY DETECTION

[75] Inventor: John William Byrd, Huntsville, Ala.

[73] Assignee: ADS Environmental Services, Inc., Huntsville, Ala.

[21] Appl. No.: 861,418

[22] Filed: May 21, 1997

[51] Int. Cl.⁶ ...................................................... G01F 1/66
[52] U.S. Cl. .......................................................... 73/861.25
[58] Field of Search ............................ 73/861.25, 861.23; 364/509, 510, 565, 576; 128/661.08, 661.09

[56] References Cited

U.S. PATENT DOCUMENTS

| | | | |
|---|---|---|---|
| 5,226,328 | 7/1993 | Petroff et al. | 73/861.25 |
| 5,271,404 | 12/1993 | Corl et al. | 128/661.08 |
| 5,333,508 | 8/1994 | Petroff et al. | |
| 5,421,211 | 6/1995 | Heckman. | |
| 5,521,883 | 5/1996 | Fage et al. | 367/90 |
| 5,582,176 | 12/1996 | Swerling et al. | |

*Primary Examiner*—Richard Chilcot
*Assistant Examiner*—Jewel Artis
*Attorney, Agent, or Firm*—Baker & Botts

[57] ABSTRACT

In the particular embodiments described in the specification, the velocity of a flowing liquid is measured by emitting acoustic signals from an acoustic signal unit into the flowing liquid and detecting signals reflected from solid particles moving with the liquid and a Fast Fourier Transform is performed on the Doppler frequency signals to produce a power signal spectrum. The resolution of the power signal spectrum is expanded at the high frequency end by taking the square root of the power signals and a least squares curve fitter produces a trend line from the data points at the upper end of the spectrum. The trend line is extrapolated to the zero amplitude axis to produce a signal representing the maximum velocity of the flowing liquid and an algorithm based on the shape of the conduit through which the liquid is flowing is used to produce a signal representing the average velocity of the liquid. That value, combined with a signal representing the level of the liquid, is used to determine the volume flow rate of the liquid.

9 Claims, 2 Drawing Sheets

LIQUID VELOCITY MEASUREMENT USING CURVE FITTING FOR PEAK VELOCITY DETECTION

SPECIFICATION

BACKGROUND OF THE INVENTION

This invention relates to arrangements for measuring the velocity of flowing liquid and, more particularly, to a unique method of determining the peak velocity of a flowing body of liquid.

In many instances, such as for example in a determination of the quantity of liquid flowing through a sewer, it is important to determine the average velocity of liquid flowing past a selected point in the flow path as described, for example, in the Petroff et al. U.S. Pat. Nos. 5,226,328 and 5,333,508, the disclosures of which are incorporated herein by reference. Since the liquid flow velocity usually varies within the region for which the average velocity is to be determined, an average value for the liquid flow velocity cannot be based solely on velocity measurements at one or more locations within the region.

In some cases, the average velocity of a moving body of liquid is estimated as a function of the maximum velocity of the liquid within the region. For example, liquid flow velocity measurements may be made using a Doppler detection system wherein an acoustic signal of specific frequency is emitted into the moving body of liquid and acoustic signals reflected from solid particles moving with the liquid are detected. The differences in the frequencies of the emitted and reflected signals i.e., the Doppler signals, are then used to determine the velocities of the reflecting solid particles. In such determinations, electronic noise and signals resulting from multiple acoustic reflections and the like tend to obscure the return signals representing the highest velocities, which have a low amplitude, thereby making it difficult or impossible to determine the maximum velocity of the liquid. Various ways of alleviating this problem have been proposed, such as by compensating for the noise level or by using a velocity signal which is below a peak velocity, such as 90% of the peak velocity, to determine the average velocity.

The Heckman U.S. Pat. No. 5,421,211 describes an arrangement for detecting the velocity of fluid flowing in a conduit in which a maximum Doppler frequency is estimated by using a high frequency edge detector in which the Doppler frequency spectrum is first zeroed and then passed through a median filter with an amplitude limiter, after which the frequency spectrum is divided into a number of cells and the ratios of the average values of amplitude within adjacent cells are determined. These are then plotted to produce a peak which indicates the high-frequency edge of the frequency spectrum, corresponding to the maximum velocity of the liquid. Such techniques, however, are complex and subject to variations and uncertainties which may affect the ultimate average velocity determination.

SUMMARY OF THE INVENTION

Accordingly, it is an object of the present invention to provide an arrangement for detecting velocity of a flowing liquid which overcomes the disadvantages of the prior art.

Another object of the present invention is to provide an arrangement for detecting the maximum velocity of a body of flowing liquid with a high degree of accuracy.

These and other objects of the invention are attained by emitting acoustic signals into a flowing body of liquid, detecting reflected acoustic signals, determining the Doppler frequencies corresponding to the reflected signals, producing a frequency domain spectrum from the received signals by generating a series of spectral frequency bins with corresponding spectral value amplitudes, generating a trend line based on the data at the upper end of the frequency spectrum, and determining the intersection of the trend line with the frequency axis to obtain a frequency value representing the maximum velocity of the flowing liquid. While other standard procedures for producing a curve to fit the data points may be used, the trend line curve is preferably prepared by using a least squares fit of the line with respect to the data points at the upper end of the spectrum.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
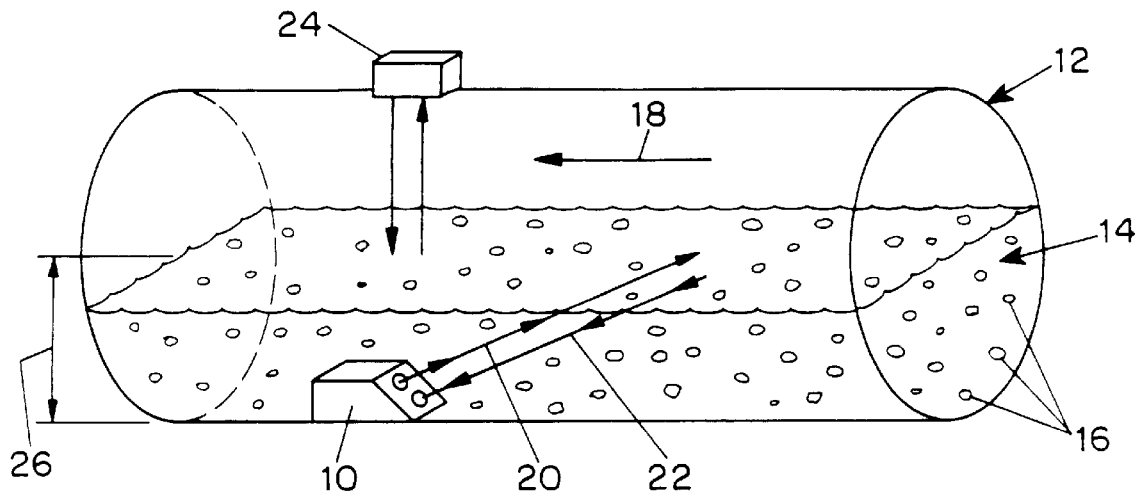
FIG. 1 is a schematic perspective view illustrating a representative arrangement for acoustic detection of the volume flow rate of liquid flowing in a conduit.
Figure 2:
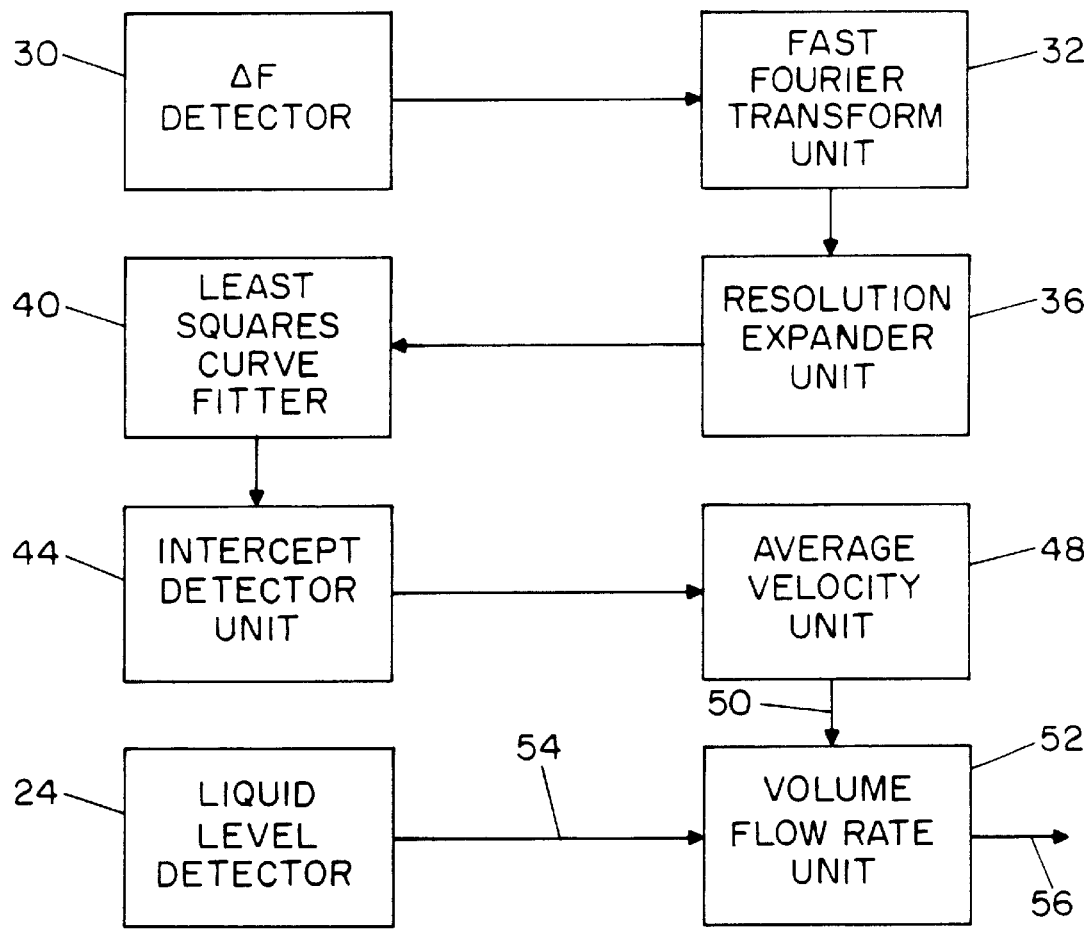
FIG. 2 is a schematic block diagram illustrating a representative arrangement of components for determining peak flow velocity in accordance with the invention.

In the typical embodiment of the invention illustrated in FIGS. 1 and 2, an acoustic transducer unit 10 is positioned at the bottom of a conduit 12 through which a body of liquid 14 carrying solid particles 16 is flowing in the direction of the arrow 18. The acoustic transducer unit transmits a beam 20 of acoustic signals having a selected frequency into the flowing liquid 14 and receives signals 22 reflected by the particles 16 which move with the liquid surrounding them. In accordance with the Doppler principle, the frequency of the reflected signals 22 will be higher, assuming the direction of flow indicated by the arrow 18, than the emitted signals by a Doppler frequency $\Delta F$ which is dependent upon the velocity of motion of the particles from which the signals are reflected. In addition, a liquid level detector 24 detects the height 26 of the liquid 14 flowing through the conduit. If the average velocity of the liquid flowing through the conduit can be determined from the $\Delta F$ data, the volume rate of flow of liquid through the conduit can be calculated knowing the depth of the liquid in the conduit and the cross-sectional area of the conduit through which the liquid is flowing.

Because of electronic noise and acoustic interference resulting from acoustic signal reflections, and because of turbulence and the inherent differences in liquid flow rates throughout the cross-section of the liquid flowing through the conduit, it is difficult to measure the average velocity of the flowing liquid using detected Doppler frequency signals. On the other hand, if the maximum velocity of the liquid can be determined accurately, an accurate estimate of the average velocity can be made based on the maximum velocity. Because there are very few particles travelling at maximum velocity in the flowing liquid and those particles are relatively small, however, the signal level at the maximum velocity end of the velocity versus signal power spectrum is very low. Consequently, it is usually not possible to distinguish the maximum velocity signal from the background level.

Figure 3:
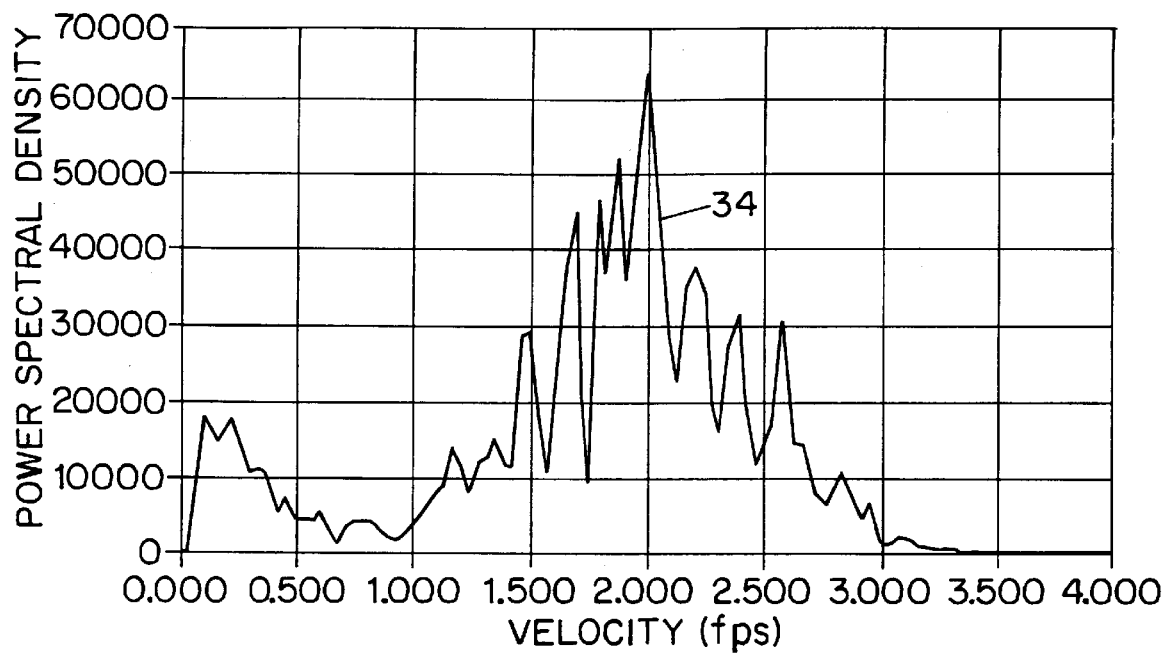
FIG. 3 is a graphical representation of a liquid velocity spectrum illustrating power spectral density versus velocity for liquid flowing in a conduit based on data obtained by an acoustic velocity measuring system.

In the particular embodiment of the invention shown in FIG. 2, a ΔF detector 30 determines the difference in frequency from the emitted frequency of the reflected frequencies detected by the acoustic signal unit 10 and all of the detected ΔF signals thus generated are supplied to a Fast Fourier Transform unit 32. The Fast Fourier Transform unit then generates a series of numbers representing the energies of the particles 16 moving at different velocities throughout the stream of liquid and those signals are sorted into a series of frequency bins to produce the power spectral density curve 34 shown in FIG. 3. This curve is a plot of the total energy represented by all the particles which produced essentially the same ΔF signal, i.e., those moving at essentially the same velocity, for all of the frequency bins. In FIG. 3, the ΔF signal has been converted to velocity, in feet per second, for the typical example illustrated, and the total energy at each frequency is represented in arbitrary units on the Y axis.

From FIG. 3, it will be noted that the fastest-moving particles i.e., those with a velocity in the neighborhood of three inches per second, generate much lower total energy at each velocity than the particles moving at lower velocities such as 1.5 to 2.5 inches per second. This is because the cross-sectional area of the water moving at the highest velocities is very small in relation to the complete cross-sectional area of the flowing liquid. In addition, most of the returned acoustic signals are reflected from particles in the slower moving water which is nearer the sensor 10 rather than from particles in the faster moving water which tends to be in the upper central portion of the moving stream. As noted above, because the signals representing the velocity of the fastest particles cannot readily be distinguished from the background electronic noise and from the effects of turbulence of the flow pattern, it is difficult to determine a maximum velocity value for the flowing liquid from the power density spectrum shown in FIG. 3.

In order to expand the signal resolution near the maximum velocity region of the spectrum, the power spectral density values of FIG. 3 are converted into corresponding voltage values by taking the square root of the power spectral density values. The voltage value for each of the frequency bins is than plotted against the Doppler frequency, or the corresponding velocity value, as indicated by the triangular data points in FIG. 4. This provides a set of specific data points 38 at the upper end of the velocity range which show a decrease in amplitude toward a zero amplitude value as the velocity increases. From these data points a trend line 42 is drawn which intersects the velocity axis at the maximum velocity value. Preferably, the trend line 42 is determined by a least squares fit with respect to the data points at the upper velocity end of the spectrum.

Figure 4:
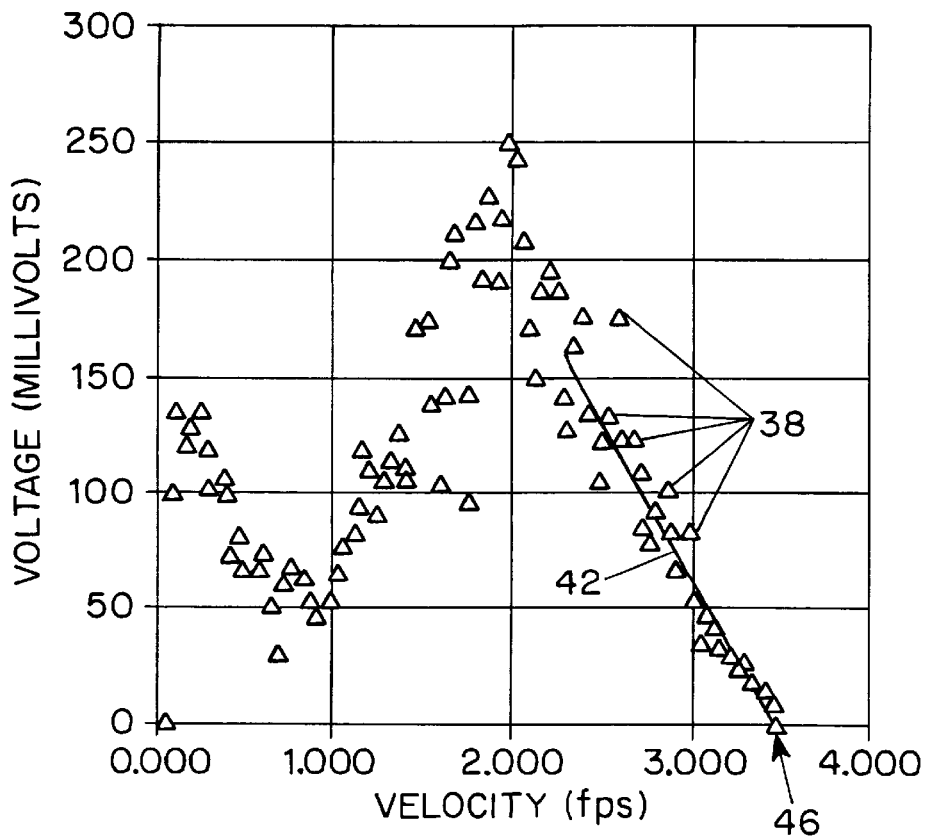
FIG. 4 is a graphical representation showing the determination of maximum velocity of liquid flowing in the conduit in accordance with the invention.

To carry out this process, the data represented by the graph 34 in FIG. 3 is supplied from the Fast Fourier Transform unit 32 of FIG. 2 to a resolution expander 36 which determines the square root of the power spectral density values in each frequency bin to produce the corresponding data points 38 shown in FIG. 4.

The amplitude value at each velocity for the data points 38 at the upper end of the spectrum is supplied to a least squares curve fitter 40 in the system of FIG. 2 which produces a trend line 42 representing the test fit for the data in that region and an intercept detector 44 determines the point 46 shown in FIG. 4, at which the trend line 42 intersects the velocity axis i.e., the zero voltage point.

The velocity value at the point 46, representing the maximum velocity of the liquid, is, in turn, supplied to an average velocity algorithm unit 48 which determines the average velocity of the liquid in a known manner from the maximum velocity of the liquid and supplies a signal 50 representing the average velocity of the liquid 14 flowing through the conduit 12 to a volume flow rate unit 52. In the volume flow rate unit 52 a signal 54 from the liquid level detector 24 is used in a known manner in combination with the average flow rate 50 and an algorithm based on the shape of the conduit 12 to produce a signal 56 representing the average volume flow rate, for example, in gallons per minute, through the conduit 12 at the time the measurements were made.

By using the curve fitting technique of the present invention, the maximum flow rate of the liquid flowing through the channel can be detected accurately and, consequently, the volume flow rate of the liquid in the channel can be determined more accurately.

Although the invention has been described herein with reference to specific embodiments, many modifications and variations therein will readily occur to those skilled in the art. Accordingly, all such variations and modifications are included within the intended scope of the invention.

I claim:

1. A method for measuring velocity of liquid flowing in a moving stream comprising the steps of: emitting acoustic signals having a selected frequency into the liquid flowing in the stream;

detecting acoustic signals reflected by particles moving with the liquid in the stream;

determining the Doppler frequencies of the reflected signals from the emitted signal;

producing a spectrum of amplitude versus Doppler frequency;

generating a trend line to fit the amplitude values at the high frequency end of the Doppler frequency spectrum; and determining the intercept of the trend line with the zero amplitude axis to produce a value representing the maximum velocity of the moving liquid in the stream.

2. A method according to claim 1 including the steps of:

detecting the level of the liquid flowing in the stream; and determining the volume flow rate of the liquid flowing in the stream from the liquid level and average velocity of the liquid flowing in the stream.

3. A method according claim 1 in which the step of producing a spectrum of amplitude versus Doppler frequency includes subjecting the detected Doppler frequency signals to a Fast Fourier Transform operation.

4. A method according to claim 1 including:

expanding the spectrum of amplitude versus Doppler frequency by taking the square root of the amplitudes of the spectrum of amplitude versus Doppler frequency.

5. A method according to claim 1 wherein the trend line of amplitude values at the upper portion of the Doppler frequency spectrum is generated by a least squares curve fitter.

6. An arrangement for measuring velocity of liquid flowing in a moving stream comprising:

an acoustic transducer unit for emitting acoustic signals into a moving stream of liquid and detecting acoustic signals reflected from particles carried by the liquid in the moving stream;

a frequency difference detector for detecting differences between the emitted acoustic signal and the reflected acoustic signals;

a Fast Fourier Transform unit for producing a spectrum of amplitude versus. Doppler frequencies;

a curve fitter for determining a trend line for the data at the upper end of the frequency spectrum; and an intercept detector for detecting the intercept of the trend line with the zero amplitude axis to produce a signal representing the maximum velocity of the liquid.

7. An arrangement according to claim 6 including:

a least squares curve fitter for determining the trend line.

8. An arrangement according to claim 6 including:

an average velocity algorithm unit for generating a signal representing the average velocity of the flowing liquid from the signal representing the maximum velocity of the liquid.

9. An arrangement according to claim 8 including:

a liquid level detector for determining the level of the flowing liquid; and a volume flow rate detector for determining the volume flow rate of the liquid from the detected level of the liquid and the average velocity of the liquid.

* * * * *